United States Patent [19]

Kondo

[11] 4,075,501
[45] Feb. 21, 1978

[54] ELECTRIC CIRCUIT FOR SELECTING OPERATIONAL CONDITIONS OF LOAD

[75] Inventor: Yoshihiko Kondo, Nagoya, Japan

[73] Assignee: Nippondenso Co., Ltd., Kariya, Japan

[21] Appl. No.: 610,437

[22] Filed: Sept. 4, 1975

[30] Foreign Application Priority Data

Sept. 30, 1974 Japan .................................. 49-113048
May 27, 1975 Japan .................................. 50-63697

[51] Int. Cl.² ........................................................ H02J 1/00
[52] U.S. Cl. .................................. 307/41; 318/DIG. 2
[58] Field of Search ....................... 307/29, 38, 39, 40, 307/41; 328/20, 25; 317/139, 140; 318/562, 102, 103, DIG. 2; 340/167 R, 168 A, 168 B

[56] References Cited

U.S. PATENT DOCUMENTS

| 3,355,577 | 11/1967 | Heuer | 317/140 |
| 3,426,259 | 2/1969 | Ziehm | 318/102 |
| 3,852,722 | 12/1974 | Neuville | 317/140 X |
| 3,899,773 | 8/1975 | Yamauchi et al. | 340/167 R |
| 3,911,316 | 10/1975 | Feick et al. | 318/562 |

Primary Examiner—Robert K. Schaefer
Assistant Examiner—John J. Feldhaus
Attorney, Agent, or Firm—Cushman, Darby & Cushman

[57] ABSTRACT

A wiper switch is connected to a wiper motor through a relay switch and further to a switch condition discrimination circuit which produces a trigger signal when the wiper switch is actuated from the closed state to the opened state and again to the closed state within a fixed time. A multivibrator is connected to the switch condition discrimination circuit and begins to oscillate upon receiving the trigger signal. The relay switch connected between the wiper motor and the wiper switch is actuated to open when receiving the oscillation pulses from the multivibrator, whereby the wiper motor is intermittently supplied with the electric power to perform the intermittent wiper operation.

10 Claims, 27 Drawing Figures

FIG.4-(A) ——— LOW (Wiper Switch) STOP

FIG.4-(B) ——— 1 0 (Transistor 5F)

ELECTRIC CIRCUIT FOR SELECTING OPERATIONAL CONDITIONS OF LOAD

BACKGROUND OF THE INVENTION

1. Field of the Invention

The present invention relates to an electric circuit for selecting operational conditions of a load such as a windshield wiper, and especially to a wiper control circuit for controlling the intermittent operations thereof.

2. Description of Prior Art

In a conventional windshield wiper system, plural switches are required to enable both a continuous wiper operation and an intermittent wiper operation in which a dwell period follows each wipe cycle.

Therefore, when the conventional windshield wiper system is required to perform the intermittent wiper operation, an additional switch is required, which would occupy another space therefor, and further the control circuit therefor becomes very complicated to comply with the required operation and electrical connections.

SUMMARY OF THE INVENTION

It is, therefore, a primary object of the present invention to provide a wiper control circuit which can enable a continuous and an intermittent wiper operations without any special switch for the intermittent wiper operation.

It is another object of the present invention to provide an electric circuit which can control selectively a plurality of loads by a single switch with a single contact and a single throw.

It is a further object of the present invention is to provide a wiper control circuit enabling an intermittent wiper operation, which is low in cost and simple in construction.

Other objects and advantages of the present invention will become more apparent from the following description when read in connection with the accompanying drawings.

DESCRIPTION OF THE PREFERRED EMBODIMENTS

Figure 1:
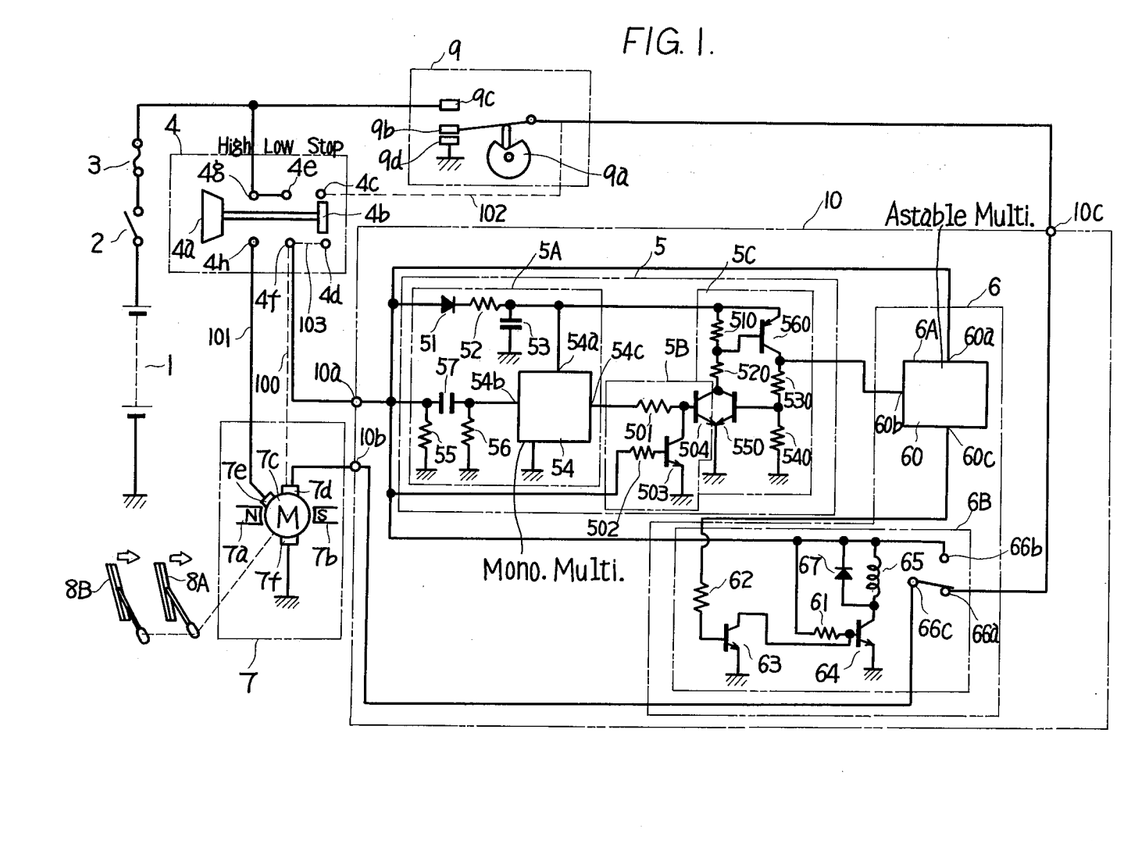
FIG. 1 is an electric wiring diagram showing a first embodiment according to the present invention.

In FIG. 1, connected to a battery 1 through a key switch 2 and a fuse 3 is a windshield wiper system for a motor vehicle which comprises a wiper switch 4, a wiper motor 7 and an automatic stopping switch 9 for stopping a wiper blade at a fixed position.

The wiper motor 7 actuates windshield wiper blades 8A and 8B. The wiper switch 4 includes a switch knob 4a, a movable contact 4b connected to the switch knob 4a, a pair of damping contacts 4c and 4d, low-speed contacts 4e and 4f and high-speed contacts 4g and 4h. The respective ones of low-speed and high-speed contacts 4e and 4g are connected to the battery 1 and the others thereof 4f and 4h are connected to the low-speed brush 7d (shown in a dotted line) and high-speed brush 7e of the wiper motor 7 respectively through lines 100 and 101. The one of the damping contact 4d is connected with the one of the low-speed contact 4f through a line 103. The wiper motor 7 further comprises permanent magnets 7a and 7b for field excitation, an armature 7c and a common grounded brush 7f.

The automatic stopping switch 9 comprises a cam 9a rotated in synchronism with the wiper motor 7, a movable contact 9b actuated by the cam 9a, a power contact 9c connected to the battery 1 and a grounded contact 9d.

The damping contact 4c is connected to the movable contact 9b through a line 102 (shown in a dotted line).

An electric circuit according to the present invention embedded in a case designated at numeral 10 is applied to the above-explained conventional windshield wiper system to perform an intermittent operation.

For the purpose, the electrical wiring connection is changed as follows. Namely, while the lines 100, 102 and 103 indicated by dotted lines are removed, a first terminal 10a is connected to the low-speed contact 4f, a second terminal 10b is connected to the low-speed brush 7d and a third terminal 10c is connected to the movable contact 9b.

The electric circuit 10 comprises a switch condition discrimination circuit 5 having a timing circuit 5A, a logic circuit 5B and a memory circuit 5C and a load actuation control circuit 6 having a pulse generating circuit 6A and an interrupting circuit 6B.

In the timing circuit 5A, a series circuit of a diode 51, a resistor 52 and a capacitor 53 is connected across the first terminal 10a and the ground, constituting a power holding circuit. The junction between the resistor 52 and the capacitor 53 is connected to a power input 54a of a monostable multivibrator 54. A differentiation circuit comprising resistors 55 and 56 and a capacitor 57 is connected between the first terminal 10a and a trigger input 54b of the multivibrator 54.

In the logic circuit 5B, a resistor 501 is connected between an output 54c of the multivibrator 54 and a base of a transistor 504 and a collector-emitter path of a transistor 503 is connected across the base of the transistor 504 and the ground. The base of the transistor 503 is connected to the first terminal 10a through a resistor 502.

In the memory circuit 5C, a first series circuit of resistors 510 and 520 and a collector-emitter path of a transistor 550 is connected across the junction of the resistor 52 and the capacitor 53 and the ground. The collector-emitter path of the transistor 504 is connected in parallel with the collector-emitter path of the transistor 550. A second series circuit of an emitter-collector path of a PNP transistor 560 and resistors 530 and 540 is connected in parallel with the above first series circuit. The base of the transistor 550 is connected with the junction between the resistors 530 and 540.

The pulse generating circuit 6A comprises an astable multivibrator 60 whose power input 60a is connected to the first terminal 10a and whose trigger input 60b is connected with a junction between the transistor 560 and the resistor 530.

In the interrupting circuit 6B, a first stationary contact 66a is connected with the third terminal 10c, a second stationary contact 66b is connected with the first terminal 10a and a movable contact 66c is connected with the second terminal 10b, wherein the movable contact 66c normally makes contact with the first stationary contact 66a. A series circuit of a relay coil 65 for bringing the movable contact 66c into contact with the second stationary contact 66b when energized, and a collector-emitter path of a transistor 64 is connected across the first terminal 10a and the ground. A diode 67 is connected in parallel with the relay coil 65 for absorbing counter electromotive force. A base of the transistor 64 is connected to the first terminal 10a through a resistor 61 and also to the ground through a collector-emitter path of a transistor 63. The base thereof is connected to the output 60c of the multivibrator 60 through a resistor 62.

The operation of the above-constructed windshield wiper system will be explained hereinafter with reference to FIG. 2.

When the switch knob 4a is moved by one step to the left in FIG. 1, namely from a stop position to the low-speed position, electric current is supplied from the battery 1 to the first terminal 10a through the key switch 2, the fuse 3, the low-speed contact 4e, the movable contact 4b and the low-speed contact 4f. Thereby, at the same time, the monostable multivibrator 54 is triggered through the differentiation circuit of the capacitor 57 and the resistors 55 and 56 to produce at its output 54c a pulse having a fixed pulse width (for example, 2 seconds) as shown in FIG. 2-(A).

Figure 2:
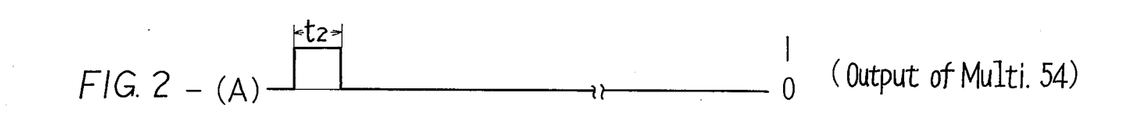
FIG. 2 is a waveform diagram for explaining the operation of the invention shown in FIG. 1.

The transistor 503 is driven into conduction at that time owing to a base current therefor through the resistor 502, whereby when the wiper switch 4 is kept at a low-speed position longer than the pulse width of the pulse from the multivibrator 54 as shown in FIG. 2-(B), the pulse is fully short-circuited to the ground through the transistor 503. Accordingly, the transistor 504 can not be driven into conduction. The transistor 64 is made conductive while the wiper switch 4 is kept at the low-speed position, and thereby the relay coil is energized to actuate the movable contact 66c to couple to the second stationary contact 66b. Then the wiper motor 7 is supplied with electric current from the second terminal 10b through the second stationary contact 66b and the movable contact 66c to operate a low-speed continuous wiper operation so long as the wiper switch 4 is kept at the low-speed position.

When the switch knob 4a is moved by a further one step to the left and the wiper switch 4 is placed at the high-speed position, electric current is supplied from the battery 1 to the high-speed brush 7e through the key switch 2, the fuse 3, the high-speed contact 4g, the movable contact 4b, the high-speed contact 4h and the line 101 to perform a high-speed continuous wiper operation.

When the wiper switch 4 is set at a stop position by pushing the switch knob 4a, the movable contact 66c makes contact with the first stationary contact 66a because of deenergization of the relay coil 65. Therefore, when the wiper blades 8A and 8B are not placed at a fixed position such as a lower portion of the windshield of the vehicle, the movable contact 9b is actuated by the cam 9a to contact with the power contact 9c, whereby the power supply to the wiper motor 7 is kept being made from the battery 1 through the automatic stopping switch 9, the first stationary contact 66a and the movable contact 66c even when the wiper switch is positioned at the stop position, until the wiper blades 8A and 8B reach the fixed position, in which the movable contact 9b of the automatic stopping switch 9 is separated from the power contact 9c and is brought into contact with the grounded contact 9d, whereby the power supply to the wiper motor 7 is cut off and dynamic braking action is carried out by the short-circuit current flowing through the armature 7c, the low-speed brush 7d, the movable contact 66c, the first stationary contact 66a, the movable contact 9b, the grounded contact 9d, the ground and the common brush 7f.

When the intermittent wiper operation is required, the wiper switch 4 is moved from "Stop" to "Low" and, again, "Stop" after the period $t_1$ has lapsed as shown in FIG. 2-(C).

At this time, the first period $t_1$ for the wiper switch 4 being placed at the low-speed position must be shorter than the period $t_2$ which is the pulse width of the pulse from the multivibrator 54. As a result, a 1-level signal from the multivibrator 54 is supplied to the base of the transistor 504 after the transistor 503 is driven into nonconduction. Since the power holding circuit of the diode 51, the resistor 52 and the capacitor 53 continues to supply the electric power to the multivibrator 54 and the memory circuit 5C for a while (for example, 3 seconds) after the wiper switch 4 is placed at the stop position, the 1-level signal is kept supplied to the base of the transistor 504 to hold it conductive. Accordingly, the transistor 560 is kept conductive while the power supply from the power holding circuit is continued after the wiper switch 4 is placed at the stop position. When the wiper switch 4 is again placed at the low-speed position during the conduction of the transistor 560 (i.e. within 2 seconds), the conduction thereof is maintained so long as the wiper switch 4 is placed at the low-speed position as shown in FIG. 2-(D), because the transistor 550 is supplied with base current through the emitter-collector path of the transistor 560. As the wiper switch 4 is again placed at the low-speed position, the astable-multivibrator 60 is supplied with electric power at the power input 60a. The trigger input 60b is further supplied with the trigger signal owing to the conduction of the transistor 560, whereby the astablemultivibrator 60 begins to oscillate as shown in FIG. 2-(E). The multivibrator 60 is so arranged as to produce pulses whose period $t_4$ is, for example, five seconds and the pulse width of a 0-level signal of which is about 0.8 to 1 second. Those pulses are supplied to the base of the transistor 63 through the resistor 62 and the transistor 64 is supplied with the base current through the resistor 61 and the plus and minus low-speed contacts 4e and 4f. Therefore, when the 1-level signal from the multivibrator 60 is applied to the base of the transistor 63, it is driven into conduction while the transistor 64 is made nonconductive, whereby the relay coil 65 is deenergized to make the movable contact 66c to close to the first stationary contact 66a.

On the other hand, when the 0-level signal from the multivibrator 60 is applied to the base of the transistor 63, it is driven into nonconduction while the transistor 64 is made conductive, whereby the relay coil 65 is energized to make the movable contact 66c to contact the second stationary contact 66b. Accordingly, the movable contact 66c is switched on and off in response to the pulses from the astable-multivibrator 60 as shown in FIG. 2-(F), whereby the wiper motor 7 is intermittently supplied with the electric power as shown in FIG. 2-(G) through the low-speed contacts 4e and 4f, the second stationary contact 66b and the movable contact 66c to perform the intermittent wiper operation. Of course, for each wiper operation the wiper blades 8A and 8B are stopped at the fixed position (the lower portion of the windshield) by means of the automatic parking switch 9.

Figure 3:
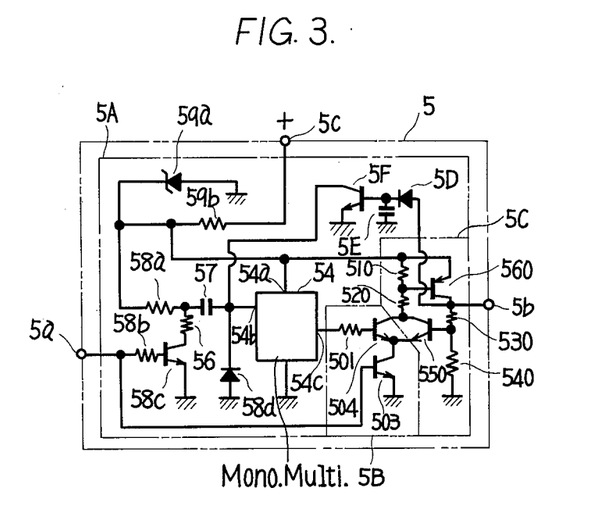
FIG. 3 is a modification of the switch condition discriminator circuit 5 in FIG. 1.

FIG. 3 shows a modification of the switch condition discrimination circuit 5 in FIG. 1, in which an input terminal 5a is to be connected with the first terminal 10a, an output terminal 5b is to be connected with the trigger input 60b of the astablemultivibrator 60 and a power input terminal 5c is to be connected with the battery 1, when the circuit in FIG. 3 is substituted for the discriminator circuit 5 of the wiper system in FIG. 1.

In FIG. 3, a power input 54a of a monostable multivibrator 54 is connected to the power input terminal 5c through a resistor 59b. A trigger input 54b thereof is also connected to the terminal 5c through a capacitor 57, a resistor 58a and the resistor 59b. A junction of the resistors 58a and 59b is grounded through a zener diode 59a. A junction of the capacitor 57 and the resistor 58a is grounded through a resistor 56 and a collector-emitter path of a transistor 58c whose base is connected to the input terminal 5a through a resistor 58b. The trigger input 54b is grounded through a collector-emitter path of a transistor 5F whose base is grounded through a capacitor 5E and is also connected to a collector of a PNP transistor 560 through a diode 5D. Numeral 58d designates a diode whose anode is grounded and whose cathode is connected with the trigger input 54b. An output 54c of the monostable multivibrator 54 is connected to a base of a transistor 504 through a resistor 501, whose collector is connected to the power input terminal 5C through resistors 520, 510 and 59b, and whose emitter is grounded through a collector-emitter path of a transistor 503. A base of the transistor 503 is connected with the input terminal 5a. A base of the PNP transistor 560 is connected with a junction of the resistors 510 and 520, an emitter thereof is connected to the power input terminal 5C through the resistor 59b and a collector thereof is grounded through resistors 530 and 540. To the junction of the resistors 530 and 540 is connected a base of a transistor 550 whose collector-emitter path is connected in parallel with the collector-emitter path of the transistor 504.

An operation will be explained. When the wiper switch 4 is placed at the low-speed position, electric power from the battery 1 is applied to the input terminal 5a to drive the transistor 58c into conduction, and then the charge previously stored in the capacitor 57 discharges through the resistor 56, the collector-emitter path of the transistor 58c and the diode 58d. At the same time, the transistor 503 also tends to be conductive owing to a base current from the input terminal 5a, however it remains still nonconductive since the transistor 504 is in a nonconductive state. Accordingly, the transistor 560 remains nonconductive, resulting in no effect on the astable multivibrator 60. The transistor 64 is driven into conduction energizing the relay coil 65, to thereby actuate the movable contact 66c to contact with the second stationary contact 66b to perform the low-speed wiper operation.

Figure 4:
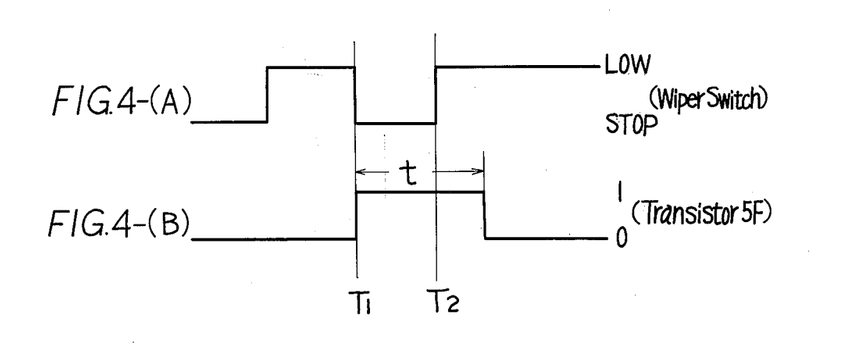
FIG. 4 is a waveform diagram for explaining the operation of the invention shown in FIG. 3.

The intermittent wiper operation will be next explained. When the wiper switch 4 is placed from the low-speed to the stop position as shown in FIG. 4-(A), the transistor 58c is driven into non-conduction, and thereby the trigger input 54b of the monostable multivibrator 54 is supplied with a trigger signal from the power input terminal 5c through the resistors 59b and 58a and the capacitor 57 until the capacitor 57 is fully charged, whereby the monostable multivibrator produces at its output 54c a pulse with a fixed pulse width as shown in FIG. 4-(B). When the wiper switch 4 is placed from "Stop" to "Low" again while the multivibrator 54 produces a signal as shown in FIG. 4-(B), both transistors 503 and 504 are driven into conduction, to thereby drive the transistor 560 into conduction. The conduction of the transistor 560 is kept so long as the wiper switch is maintained at the low-speed position. The astable multivibrator 60 is supplied with a trigger signal at its trigger input 60b upon the conduction of the transistor 560, whereby the intermittent wiper operation is performed in the same manner explained with respect to FIG. 1.

An operation for switching from the intermittent wiper operation to the low-speed wiper operation will be explained. During the intermittent wiper operation, the transistor 560 is kept conductive as explained above, whereby the capacitor 5E is charged through the diode 5D. When the charge on the capacitor 5E exceeds a predetermined value, the transistor 5F is kept to tend to be conductive. When the wiper switch 4 is placed from the low-speed to the stop position at $T_1$ in FIG. 4-(A), the transistor 503 is driven into nonconduction, thus stopping the intermittent wiper operation. At the same time, since the transistor 58c is also driven into nonconduction, the transistor 5F becomes conductive for a while as designated by $t$ in FIG. 4-(B) in order to bypass the trigger signal to the trigger input 54b through the resistors 59b and 58a, the capacitor 57 and the collector-emitter path of the transistor 5F. Therefore, even when the wiper switch 4 is placed from the stop to the low-speed position at $T_2$ as shown in FIG. 4-(A) soon after the wiper switch 4 is placed at the stop position at $T_1$, the wiper system can perform not the intermittent wiper operation but the low-speed wiper operation. Because, when the wiper system is switched from the intermittent wiper operation to the low-speed wiper operation, the monostable multivibrator 54 does not produce the signal as explained above.

Figure 5:
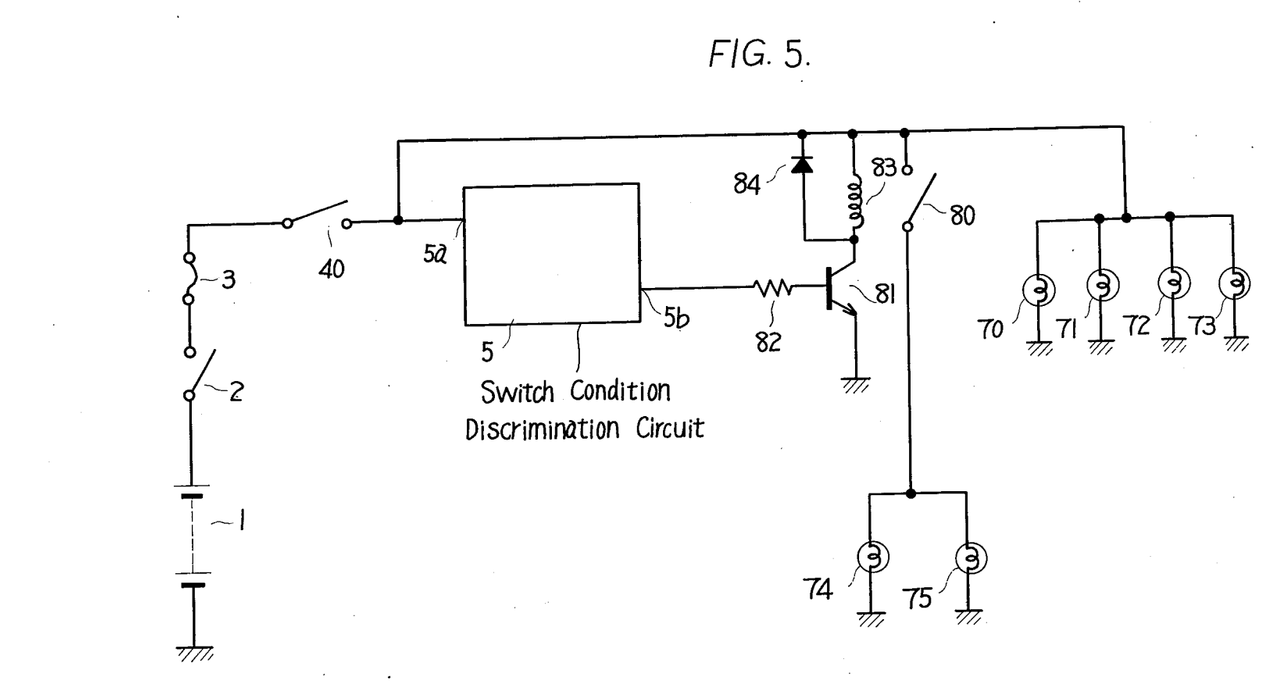
FIG. 5 is an electric wiring diagram showing a second embodiment according to the present invention.

FIG. 5 shows a second embodiment according to the present invention, which is applied for controlling headlights and foglamps.

In FIG. 5, a lamp switch 40 is connected between the fuse 3 and an input terminal 5a of the switch condition discrimination circuit 45 as is the same in FIGS. 1 and 3. Headlights 70 to 73 are connected to the battery 1 through the lamp switch 40. Foglamps 74 and 75 are also connected to the battery through a normally-open switch 80 and the lamp switch 40. The output terminal 5b of the discrimination circuit 5 is connected to a base of a transistor 81 through a resistor 82, whose collector is connected to the lamp switch 40 through a relay coil 83 and whose emitter is grounded. Numeral 84 designates a diode for absorbing counter electro motive force.

In operation, when the lamp switch 40 is closed, headlamps 70 to 73 are lighted. When the lamp switch 40 is actuated from the closed state to the opened state and again to the closed state in the same manner as the first embodiment, the discrimination circuit 5 produces at its output 5b a signal, to thereby drive the transistor 81 into conduction. When the transistor 81 is made conductive, the relay coil 83 is energized to close the normally-open switch 80, thus lighting the foglamps 74 and 75.

Figure 6:
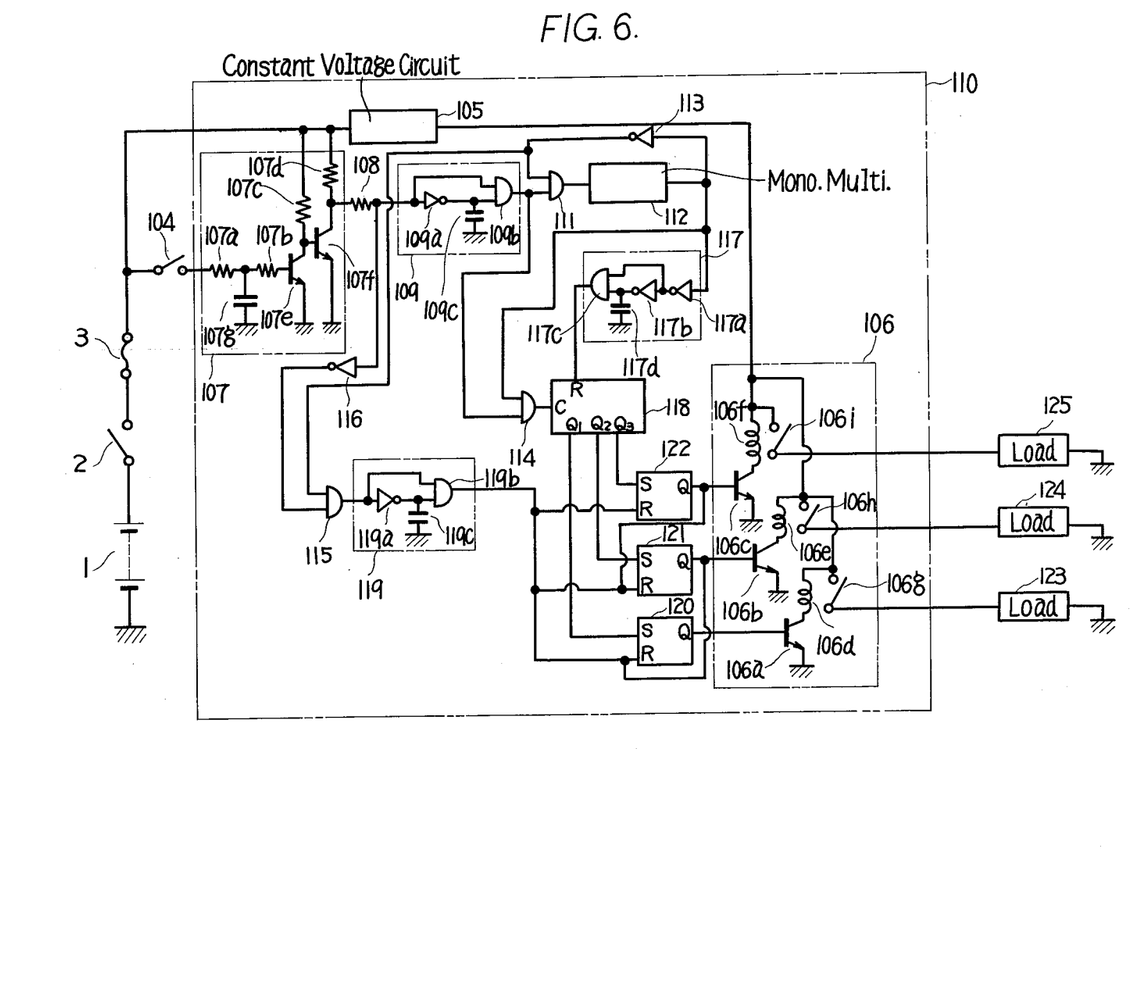
FIG. 6 is an electric wiring diagram showing a third embodiment according to the present invention.

FIG. 6 shows a third embodiment of the present invention, in which an electric control 110 circuit is shown for selectively operating three loads by one switch 104.

In FIG. 6, a constant voltage circuit 105 is connected to the battery 1 through the key switch 2 and the fuse 3 as well as to a load actuation control circuit 106 for supplying constant voltage thereto. A wave reforming circuit 107 is connected at its input with the switch 104 and at its output to a first pulse generator 109 through a resistor 108 and also to one input terminal of an AND circuit 115 through an inverter 116. The wave reforming circuit 107 includes resistors 107a and 107b connected between the input and a base of a transistor 107e, a capacitor 107g connected between the ground and a junction of the resistors 107a and 107b, resistors 107c and 107d and a transistor 107f. The first pulse generator 109 includes an inverter 109a, an AND circuit 109b and a capacitor 109c and produces a 1-level signal when the input signal therefor rises from 0-level to 1-level. The output signal from the pulse generator 109 is supplied to each one input terminal of AND circuits 111 and 114. An output terminal of the AND circuit 111 is connected to a monostable multivibrator 112 whose output is supplied to the other input terminal of the AND circuit 114, each of the other input terminals of the AND circuits 111 and 115 through an inverter 113 and also an input of a second pulse generator 117. An output of the second pulse generator 117 is connected to a reset terminal of a counter circuit 118. The second pulse generator 117 includes inverters 117a and 117b, an AND circuit 117c and a capacitor 117d and produces a 1-level signal when the input signal therefor falls from 1-level to 0-level. An output terminal of the AND circuit 114 is connected to a clock-pulse input C of the counter circuit 118 whose outputs $Q_1$, $Q_2$ and $Q_3$ are respectively connected to each of set terminals S of first, second and third R-S flip-flop circuits 120, 121 and 122. An output terminal of the AND circuit 115 is connected to an input of a third pulse generator 119 which includes an inverter 119a, an AND circuit 119b and a capacitor 119c. The third pulse generator 119 produces a 1-level signal when the input signal therefor rises from 0-level to 1-level and the output thereof is respectively applied to each of reset terminals R of the flip-flop circuits 120, 121 and 122. Each output terminal Q thereof is respectively connected with each base of first, second and third transistors 106a, 106b and 106c of the load actuation control circuit 106. Each collector thereof is connected to the constant voltage circuit 105 respectively through first, second and third exciting coils 106d, 106e and 106f. First, second and third normally-open switches 106g, 106h and 106i are respectively connected to first, second and third loads 123, 124 and 125. Each of the switches is energized by each of the exciting coils 106d, 106e and 106f to close in order to supply electric power to the loads 123, 124 and 125.

Figure 7:
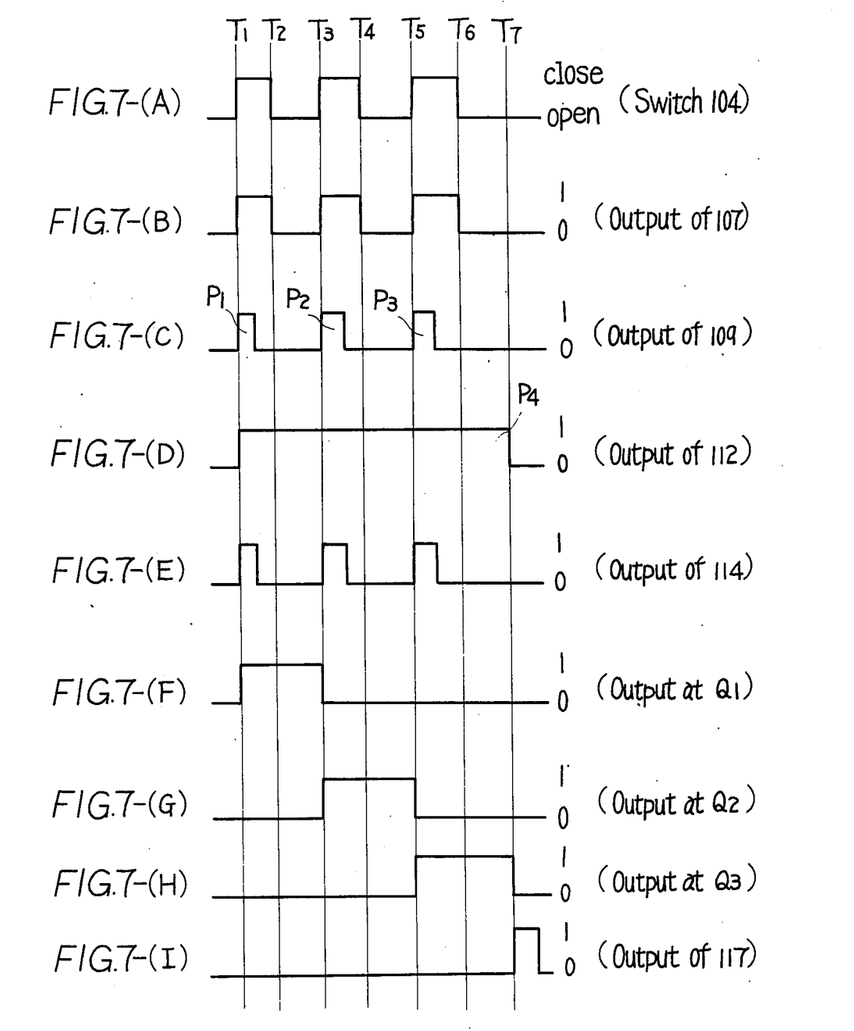
FIG. 7 is a waveform diagram for explaining the operation of the invention shown in FIG. 6.

An operation will be explained with reference to FIG. 7. When the switch 104 is closed at $T_1$ as shown in FIG. 7-(A), the output of the wave reforming circuit 107 rises from 0-level to 1-level as shown in FIG. 7-(B), whereby the first pulse generator 109 produces a 1-level signal indicated by $P_1$ in FIG. 7-(C) upon receiving the 1-level signal from the circuit 107. The AND circuit 111 applies a trigger signal to the monostable multivibrator 112 upon receiving the 1-level signal from the generator 109, whereby the monostable multivibrator 112 produces a 1-level signal indicated by $P_4$ having a fixed pulse width (for example, 2 seconds) as shown in FIG. 7-(D). Both 1-level signals from the generator 109 and the multivibrator 112 are applied to the AND circuit 114 to cause it to produce a 1-level signal as shown in FIG. 7-(E), whereby the counter circuit 118 produces at its output $Q_1$ a 1-level signal as shown in FIG. 7-(F), which is supplied to the set terminal of the first R-S flip-flop circuit 120, to cause it to produce a 1-level signal at its output Q as shown in FIG. 7-(F). Accordingly, the first transistor 106a is driven into conduction, and the first exciting coil 106d is thereby energized to close the first normally-open switch 106g. Thus, the first load 123 is energized. When the switch 104 is closed again at $T_3$ after once opened at $T_2$ as shown in FIG. 7-(A), the 1-level signal from the wave reforming circuit 107 is supplied to the pulse generator 109 to cause it to produce a 1-level signal indicated by $P_2$ in FIG. 7-(C), which is supplied to one input terminal of the AND circuit 114. If this signal $P_2$ is supplied to the AND circuit 114 while the signal $P_4$ from the multivibrator 112 is still applied to the other input terminal of the AND circuit 114, the AND circuit 114 produces a 1-level signal, which is supplied to the counter 118, to cause it to produce at its output $Q_2$ a 1-level signal as shown in FIG. 7-(G). The second R-S flip-flop circuit 121 produces a 1-level signal at its output Q upon receiving the 1-level signal at its set terminal, to drive the second transistor 106b into conduction. Accordingly, the second exciting coil 106e is energized to close the second normally-open switch 106h, thus energizing the second load 124. At the same time, the 1-level signal from the second R-S flip-flop circuit 121 is supplied to the reset terminal R of the first R-S flip-flop circuit 120, whereby the energization of the first load is ceased. When the switch 104 is closed further again by the like manner at $T_5$ after once opened at $T_4$ as shown in FIG. 7-(A), the 1-level signal from the wave reforming circuit 107 is supplied to the pulse generator 109 to cause it to produce a 1-level signal indicated by $P_3$ in FIG. 7-(C), which is supplied to the one input terminal of the AND circuit 114. If this signal $P_3$ is supplied to the AND circuit 114 while the signal $P_4$ from the multivibrator is still applied to the other input terminal of the AND circuit 114, the AND circuit 114 produces a 1-level signal, which is supplied to the counter 118, to cause it to produce at its output $Q_3$ a 1-level signal as shown in FIG. 7-(H). The third R-S flip-flop circuit 122 produces a 1-level signal at its output Q upon receiving the 1-level signal at its set terminal, to drive the third transistor 106c into conduction. Therefore, the third exciting coil 106f is energized to close the third normally-open switch 106i, thus energizing the third load 125. At the same time, the energization of the second load 124 is ceased since the second R-S flip-flop circuit 121 receives the 1-level signal at its reset terminal from the third R-S flip-flop circuit 122.

After passing the fixed time of the pulse $P_4$, the output of the multivibrator 112 falls from the 1-level to the 0-level at $T_7$ as shown in FIG. 7-(D) causing the pulse generator 117 to produce a 1-level signal as shown in FIG. 7-(I), which is applied to the reset terminal of the counter 118. When the switch 104 is opened after the 1-level signal $P_4$ from the multivibrator 112 disappears, the pulse generator 119 produces a 1-level signal, which is applied to each of the reset terminals of the R-S flip-flop circuits 120, 121 and 122, whereby the energization of any one of the loads is ceased.

Figure 8:
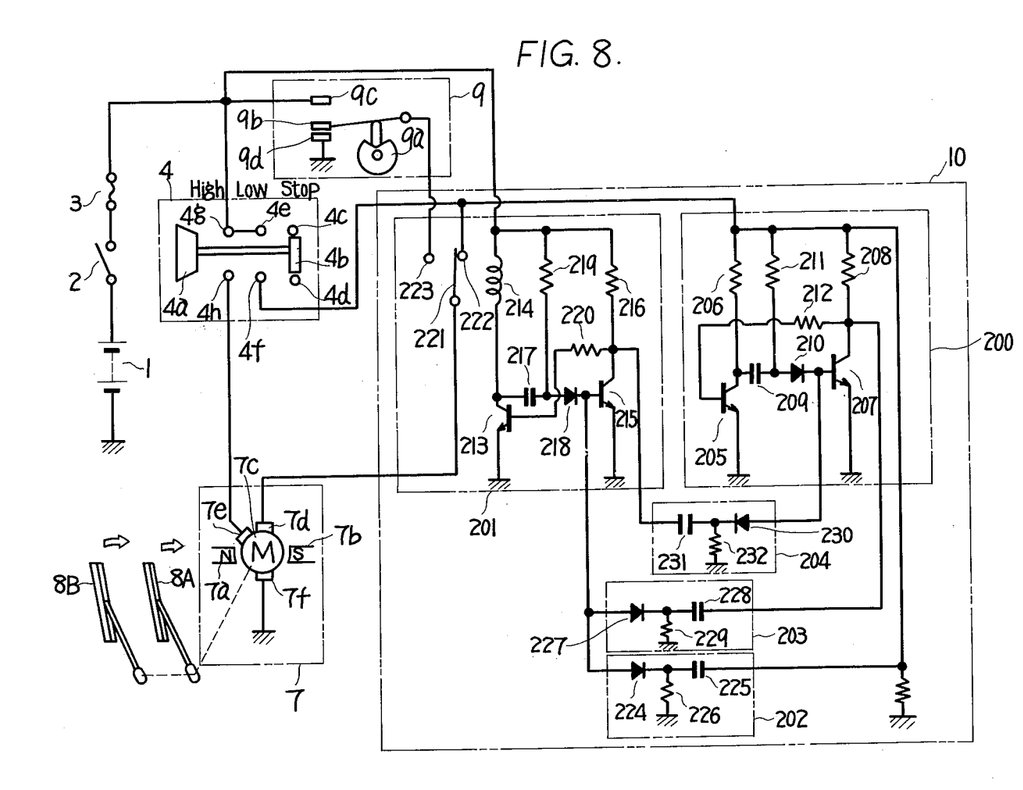
FIG. 8 is an electric wiring diagram showing a fourth embodiment according to the present invention.

In FIG. 8, a wiper control circuit 10 includes a first and a second monostable multivibrators 200 and 201 and a first, a second and a third differentiation circuits 202, 203 and 204. A collector-emitter path of a transistor 205 is connected between the ground and the minus low-speed contact 4f through a resistor 206. A collector-emitter path of a transistor 207 is likewise connected between the ground and the contact 4f through a resistor 208. The collector of the transistor 205 is connected to the base of the transistor 207 through a capacitor 209 and a diode 210. A junction between the capacitor 209 and the diode 210 is connected to the contact 4f through a resistor 211. The base of the transistor 205 is connected to the collector of the transistor 207 through a resistor 212.

In the second monostable multivibrator 201, a collector-emitter path of a transistor 213 is connected between the ground and the battery 1 through the key switch 2, the fuse 3 and a relay coil 214. A collector-emitter path of a transistor 215 is likewise connected between the ground and the battery 1 through a resistor 216. The collector of the transistor 213 is connected to the base of the transistor 215 through a capacitor 217 and a diode 218. A junction between the capacitor 217 and the diode 218 is connected to the battery through a resistor 219. The base of the transistor 213 is connected to the collector of the transistor 215 through a resistor 220. A movable contact 221 is connected to the low-speed brush 7d of the wiper motor 7 and is normally closed to a first stationary contact 222, which is connected to the minus low-speed contact 4f. A second stationary contact 223 is connected to the movable contact 9b of the automatic parking switch 9, to which the movable contact 221 is closed when the relay coil 214 is energized owing to a conduction of the transistor 213. In the first differentiation circuit 202, a diode 224 is connected at its anode with the base of the transistor 215 and at its cathode to the contact 4f through a capacitor 225. A junction between the diode 224 and the capacitor 225 is grounded through a resistor 226.

In the second differentiation circuit 203, a diode 227 is connected at its anode with the base of the transistor 215 and at its cathode to the collector of the transistor 207 through a capacitor 228. A junction between the diode 227 and the capacitor 228 is grounded through a resistor 229.

In the third differentiation circuit 204, a diode 230 is connected at its anode with the base of the transistor 207 and at its cathode to the collector of the transistor 215 through a capacitor 231. A junction of the diode 230 and the capacitor 231 is grounded through a resistor 232.

An operation will be explained with reference to FIG. 9. When the key switch 2 is closed, current from the battery 1 flows through the key switch 2, the fuse 3, the resistor 219, the diode 218 and the base-emitter path of the transistor 215 to drive the transistor 215 into conduction. For that account, the transistor 213 is not supplied with base current, resulting in a nonconductive state, whereby the closure of the movable contact 221 to the first stationary contact 222 is kept. Thus, the second multivibrator 201 remains in a stable condition.

Thereafter, when the wiper switch 4 is placed from the stop to the low-speed position, the first differentiation circuit 202 does not produce a trigger pulse to the second monostable multivibrator 201. Then, it still remains in the stable condition keeping the movable contact 221 close to the first stationary contact 222, whereby the wiper motor 7 is supplied with electric power from the battery 1 through the key switch 2, the fuse 3, the plus low-speed contact 4e, the minus low-speed 4f, the first stationary contact 222 and the movable contact 221, to perform a low-speed wiper operation. When the wiper switch 4 is placed from the low-speed to the stop position, the first differentiation circuit 202 produces the trigger pulse to the second multivibrator 201 to drive the transistor 215 into nonconduction. Then, the transistor 213 is driven into conduction and its conductive state is kept during a fixed time (for example 2 ~ 3 seconds) defined by the capacitor 217 and the resistor 219 as shown in FIG. 9-(B). Accordingly the relay coil 214 is energized during that period to actuate the movable contact 221 to close to the second stationary contact 223, whereby when the wiper blades 8A and 8B are not placed at their fixed position (the lower portion of the windshield) the power supply to the wiper motor is continued from the battery through the automatic parking switch 9, the second stationary contact 223 and the movable contact 221. When the wiper blades 8A and 8B reach their fixed position, the movable contact 9b is separated from the contact 9c being closed to the grounded contact 9d, and thereby the power supply to the wiper motor 7 is ceased and the wiper operation is quickly stopped by the dynamic braking through the low-speed brush 7d, the movable contact 221, the second stationary contact 223, the movable contact 9b, the grounded contact 9d, the ground and the common brush 7f.

The intermittent wiper operation will now be explained. When the wiper switch 4 is placed from the stop to the low-speed position at $T_3$ as shown in FIG. 9-(A) while the transistor 213 remains conductive, the transistor 207 is in a conductive state and then the transistor 205 is in a nonconductive state.

Figure 9:
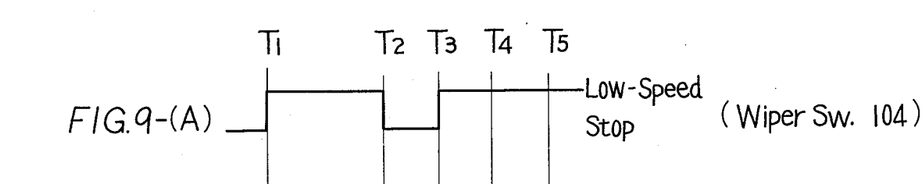
FIG. 9 is a waveform diagram for explaining the operation of the invention shown in FIG. 8.

Thereafter, when the transistor 213 becomes nonconductive owing to a conduction of the transistor 215 at $T_4$ as shown in FIG. 9-(B), the third differentiation circuit 204 produces a trigger pulse which is supplied to the base of the transistor 207 to drive it into nonconduction as shown in FIG. 9-(C). At that time, the transistor 205 is driven into conduction as shown in FIG. 9-(D). After a certain while, when the transistor 205 becomes nonconductive owing to a conduction of the transistor 207 at $T_5$ as shown in FIG. 9-(D), the second differentiation circuit 203 produces a trigger pulse which is supplied to the base of the transistor 215 to drive it into non-conduction. Due to the nonconduction of the transistor 215, the transistor 213 is again forced to become conductive. Consequently, the wiper control circuit 10 repeats the above operation, in which the transistor 213 is intermittently driven into conduction to energize the relay coil, to thereby actuate the movable contact 221 to close to the second stationary contact 223. Therefore, the intermittent wiper operation can be obtained.

What we claim is:

1. An electric circuit for selecting operational conditions of loads comprising:

an operational switch to be connected to a source of current;

a relay switch including at least one relay coil and one movable relay contact having a terminal to be connected to a load;

a trigger pulse generating circuit, connected to said operational switch, for producing a trigger pulse when said operational switch is at least once actuated from the closed state to the opened state and again to the closed state within a fixed time; and a switching circuit, connected to said trigger pulse generating circuit, for actuating said relay switch upon receiving said trigger signal whereby the operational condition of said load is changed from one to the other condition, including means for generating a train of pulses at a fixed frequency in response to said trigger signal, means for coupling said pulses to said relay coil for intermittently shifting said contact to a position disconnecting said load from said source of current.

2. An electric circuit for selecting operational conditions of loads comprising;

a source of current;

an operational switch connected to said source of current;

a first load connected to said operational switch and energized when said operational switch is closed;

a second load connected to said source of current through a relay contact;

a switch condition discriminator circuit, connected to said operational switch, for producing a trigger signal when said operational switch is actuated from the closed to the opened and again to the closed state within a fixed time; and a switching circuit, connected to said switch condition discriminator circuit, for actuating said relay contact to close upon receiving said trigger signal, thereby to energize said second load.

3. A wiper control circuit comprising;

a source of current;

a wiper switch connected to said source of current;

a wiper motor;

a switch condition discriminator circuit, connected to said wiper switch, for producing a trigger signal when said wiper switch is actuated from the closed state to the opened state and again to the closed state within a fixed time;

a pulse generator, connected to said switch condition discriminator circuit, for producing pulses upon receiving said trigger signal;

a relay contact, connected between said wiper switch and said wiper motor, for supplying electric power to said wiper motor when closed;

a relay coil for actuating said relay contact to open in response to said pulses, whereby said wiper motor is supplied with the electric power intermittently in response to the closure of said relay contact to perform the intermittent wiper operation.

4. A wiper control circuit comprising;

a source of current;

a wiper switch connected to said source of current;

a wiper motor for operating a windshield wiper blade;

a relay switch connected between said wiper switch and said wiper motor and including a relay coil and a normally closed relay contact actuated to open by the energization of said relay coil;

a first monostable multivibrator connected to said wiper switch and including a first and a second transistors;

a second monostable multivibrator connected to said source of current and including a third and a fourth transistors;

a first differentiation circuit, connected between said wiper switch and the base of said third transistor, for producing a trigger signal to said third transistor for driving it into nonconduction when said wiper switch is actuated from the closed to the opened state;

a second differentiation circuit, connected between the base of said first transistor and the collector of said third transistor, for producing a trigger signal to said first transistor for driving it into nonconduction when said third transistor becomes conductive; and a third differentiation circuit, connected between said base of said third transistor and the collector of said first transistor, for producing a trigger signal to said third transistor for driving it into nonconduction when said first transistor becomes conductive;

said fourth transistor being driven into conduction when said third transistor becomes nonconductive;

said relay coil being connected to said fourth transistor and energized when said fourth transistor becomes conductive.

5. An electric circuit for selecting operational conditions of loads comprising;

a source of current;

a manually-operated switch connected to said source of current;

a load having at least two operational states;

a first means for generating a first pulse having a fixed pulse width in synchronism with the actuation of said manually-operated switch;

a second means for generating a second pulse having a pulse width which corresponds to the actuation time of said manually-operated switch;

a third means for detecting whether said second pulse is generated in the fixed period determined by said first pulse;

a fourth means for generating a signal in response to the detection of said third means; and a fifth means for selectively driving said load in response to said signal of said fourth means.

6. An electric circuit for selecting operational conditions of loads comprising;

a source of current;

a manually-operated switch connected to said source of current;

a plurality of loads;

a first means for generating a first pulse having a fixed pulse width in synchronism with the actuation of said manually-operated switch;

a second means for generating a second pulse having a pulse width which corresponds to the actuation time of said manually-operated switch;

a third means for detecting whether said second pulse is generated in the fixed period determined by said first pulse;

a fourth means for generating a signal in response to the detection of said third means; and a fifth means for selectively driving said loads in response to said signal of said fourth means.

7. A method for selectively driving a load comprising the steps of;

actuating a manually-operated switch;

generating a first pulse having a fixed pulse width in synchronism with the actuation of said manually-operated switch;

generating a second pulse having a pulse width which corresponds to the actuation time of said manually-operated switch;

detecting whether said second pulse is generated in the fixed period determined by said first pulse; and generating a third pulse in response to the detection of the last said means; and driving selectively a load in response to said third pulse.

8. An electric circuit for selecting operational conditions of electric loads comprising:

an operational switch having a manually-operated movable contact adapted to be selectively actuated to either a first position or a second position;

discrimination means, connected to said operational switch, for discriminating whether said movable contact is actuated from said first position to said second position and again to said first position within a predetermined time interval or not;

pulse generation means, connected to said discrimination means, for generating a train of pulse signals at a fixed frequency in response to the output signal of said discrimination means indicating that said movable contact is actuated from said first position to said second position and again to said first position within said predetermined time interval, and selection means, adapted to operatively connect an electric load with a source of electric power while said movable contact is kept actuated to said first position, for selecting the operational condition of said electric load, said selection means constantly connecting and intermittently connecting said electric load with said source of electric power while said pulse signals are not generated and generated, respectively, to thereby select either the continuous operation or the intermittent operation of said electric load with said movable contact of said operational switch actuated to said first position.

9. An electric circuit according to claim 8, wherein said discrimination means includes:

a monostable circuit, connected to said operational switch, for producing a pulse signal having the time width equal to said predetermined time interval when said movable contact is actuated from said first position;

a detection circuit, connected to said operational switch, for producing a detection signal when said movable contact is actuated to said first position; and a logic circuit, connected to said monostable circuit and said detection circuit, for producing the output signal when said detection signal is generated during the time width of said pulse signal, said output signal indicating that said movable contact is actuated from said first position to said second position and again to said first position within said predetermined time interval.

10. An electric circuit according to claim 9, wherein said operational switch is connected between said source of power and said selection means, for constantly connecting the latter with the former while said movable contact is kept actuated to said first position and constantly disconnecting the latter from the former while said movable contact is kept actuated to said second position.

* * * * *